United States Patent Office 3,426,062
Patented Feb. 4, 1969

3,426,062
REACTION PRODUCT OF POLYHALOPOLYHY-DROPOLYCYCLICDICARBOXYLIC ACIDS, ANHYDRIDES OR ESTERS THEREOF WITH N,N-DICYCLOALKYL-ALKANOLAMINE
Robert H. Rosenwald, Western Springs, Ill., assignor to Universal Oil Products Company, Des Plaines, Ill., a corporation of Delaware
No Drawing. Filed Apr. 5, 1965, Ser. No. 445,759
U.S. Cl. 260—468                                  8 Claims
Int. Cl. C07c 69/94

ABSTRACT OF THE DISCLOSURE

Reaction product of polyhalopolyhydropolycyclicdicarboxylic acid, anhydride or ester thereof with N,N-dicycloalkyl-alkanolamine, exemplified by reaction product of 5,6,7,8,9,9-hexachloro - 1,2,3,4,4a,5,8,8a - octahydro - 5,8-methano-2,3-naphthalenedicarboxylic acid with N,N - dicyclohexylethanolamine. The compounds are useful as stabilizing additives for gasoline, lube oil and other organic substrates normally subject to oxidative or thermal deterioration.

---

This application relates to a novel composition of matter comprising the reaction product of a particular type of dicarboxylic acid or derivative thereof with an N,N-dicycloalkyl-alkanolamine.

In one embodiment the present invention relates to the reaction product of a compound selected from the group consisting of polyhalopolyhydropolycyclicdicarboxylic acid and derivative thereof with N,N-dicycloalkyl-alkanolamine.

In another embodiment the present invention relates to the use of the reaction product as an additive in organic substances including hydrocarbon oils and particularly lubricants, as well as plastics, textiles, etc., requiring flameproofing properties.

As hereinbefore set forth, the reaction product of the present invention is prepared by the reaction of a particular dicarboxylic acid or derivative thereof with an N,N-dicycloalkyl-alkanolamine. The particular type of acid for use in the present invention is a polyhalopolyhydropolycyclicdicarboxylic acid or anhydride thereof. Any suitable acid or anhydride meeting these requirements is used in accordance with the present invention. In one embodiment the acid or anhydride is of the type known in the art as "Chlorendic" or "HET" acid or anhydride. This acid is prepared by the Diels-Alder addition reaction of maleic acid and hexachlorocyclopentadiene. The corresponding anhydride is prepared by the reaction of maleic anhydride and hexachlorocyclopentadiene. This acid or anhydride also may be named 1,4,5,6,7,7-hexachlorordicyclo-(2.2.1)-5-heptene-2,3-dicarboxylic acid or the corresponding anhydride. These compounds are prepared by the reaction of equal molar quantities of the reactants, generally by refluxing in the presence of a solvent. These reactions are well known in the art and are described, for example, in U.S. Patent 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2-dichlorocyclopentadiene, 1,5-dichlorocyclopentadiene, 1,2,3-trichlorocyclopentadiene, 1,2,3,4 - tetrachlorocyclopentadiene, 1,2,3,4,5 - pentachlorocyclopentadiene and similar compounds in which all or part of the chlorine is replaced by other halogen and particularly bromine.

A particularly preferred polyhalopolyhydropolycyclicdicarboxylic acid or anhydride is prepared by the Diels-Alder condensation of a conjugated aliphatic diene with an olefinic dicarboxylic acid and then further condensing the resultant cyclohexendicarboxylic acid with a halocycloalkadiene. A specifically preferred reaction product is the Diels-Alder condensation of 1,3-butadiene with maleic acid to form 1,2,3,6-tetrahydrophthalic acid, followed by the Diels-Alder condensation with hexachlorocyclopentadiene. The product may be named 5,6,7,8,9,9-hexachloro-1,2,3,4,4a,5,8,8a-octahydro-5,8-methano-2,3 - napthalenedicarboxylic acid, hereinafter referred to as "A" acid. The corresponding anhydride is prepared starting with maleic anhydride instead of maleic acid. The anhydride may be named 5,6,7,8,9,9-hexachloro-1,2,3,4,4a,5,8,8a-octahydro-5,8-methano-2,3-naphthalenedicarboxylic anhydride, hereinafter referred to as "A" anhydride. Here again, other conjugated aliphatic dienes may be used including, for example, 2-methyl-1,3-butadiene, 1,3-pentadiene, 1,3-hexadiene, 2,4-hexadiene, 2,3-dimethyl-1,3-butadiene, 1,3- heptadiene, 2,4-heptadiene, conjugated nonadienes, etc., halodienes, as for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also other halocycloalkadienes may be used including, for example, those specifically hereinbefore set forth. The preparation of these compounds also is known in the art and is set forth in detail in U.S. Patent 3,017,431.

Still another preferred polyhalopolyhydropolycyclicdicarboxylic acid or anhydride is prepared by condensing cyclopentadiene with maleic acid or maleic anhydride to form norborn-5-ene-2,3-dicarboxylic acid or anhydride and then condensing the same with hexachlorocyclopentadiene. The product may be named 5,6,7,8,9,9-hexachloro-1,2,3,4,4a,5,8,8a-octahydro-1,4,5,8-dimethano-2,3 - naphthalenedicarboxylic acid or anhydride, hereinafter referred to as "B" acid and "B" anhydride respectively. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

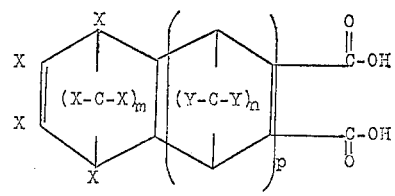

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7-hexachloro-(2.2.1)-5-heptene-2,3 - dicarboxylic acid or the corresponding anhydride. Similarly, when X is chlorine, $m$ is one, $n$ is zero and $p$ is one, the compound is 5,6,7,8,9,9-hexachloro-1,2,3,4,4a,5,8,8a-octahydro - 5,8-methano-2,3-naphtalenedicarboxylic acid or the corresponding anhydride. Also, when X is chlorine, Y is hydrogen, $m$ is one, $n$ is one and $p$ is one, the compound is 5,6,7,8,9,9-hexachloro-1,2,3,4,4a,5,8,8a-octahydro - 1,4,5,8-dimethano-2,3-naphthalenedicarboxylic acid or the corresponding anhydride.

While the particular acid or anhydride set forth above is preferred, it is understood that an ester of the acid may be used for reacting with the N,N-dicycloalkylalkanolamine. Any suitable ester may be used and is prepared by reacting the acid with a lower alcohol under conditions to liberate alcohol. By lower alcohol I mean an alcohol containing from one to four carbon atoms and thus includes methanol, ethanol, propanol and butanol. In subsequent reaction with the N,N-dicycloalkyl-alkanolamine, transesterification occurs to form a new ester.

As hereinbefore set forth the dicarboxylic acid, anhydride or ester is reacted with an N,N-dicycloalkyl-alkanolamine. In a preferred embodiment the N,N-dicycloalkyl - alkanolamine is N,N-dicyclohexyl-ethanolamine. Other N,N - dicycloalkyl-ethanolamines include N,N-dicyclopentyl-ethanolamine, N,N-dicycloheptyl-ethanolamine, N,N-dicyclooctyl-ethanolamine, etc., as well as compounds in which the cycloalkyl groups are different as, for example, N-cyclopentyl - N - cyclohexyl-ethanolamine, N-cyclopentyl-N-cycloheptyl-ethanolamine, N-cyclopentyl-N-cyclooctyl-ethanolamine, N - cyclopentyl-N-cyclononyl-ethanolamine, N-cyclopentyl - N - cyclodecyl-ethanolamine, etc., N-cyclohexyl-N-cycloheptyl - ehtanol-amine, etc. The specific compounds set forth above are examples of N,N-dicycloalkyl-ethanolamines. Other N,N-dicycloalkyl-alkanolamines include the corresponding N,N-dicycloalkyl-propanolamines, N,N-dicycloalkyl-butanolamines, N,N-dicycloalkyl-pentanolamines, N,N - dicycloalkyl-hexanolamines, N,N - dicycloalkyl - heptanol-amines, N,N-dicycloalkyl-octanolamines, and higher N,N-dicycloalkyl-alkanolamines. The carbon atoms in the N,N-dicycloalkyl-propanolamines and higher N,N-dicycloalkyl-alkanolamines may be straight or branched chain. It is understood that one or both of the cycloalkyl groups may contain one or more substituents attached thereto and preferably hydrocarbyl substituents including alkyl, aralkyl, aryl, alkaryl, cycloalkyl, etc.

The N,N-dicycloalkyl-alkanolamine is reacted with the polycarboxylic acid, anhydride or ester in any suitable manner. The reaction getnerally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene the order of 300–320° F. Other solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by opertating under reduced pressure, by removing an azeotrope of water-solvent, by distilling the reaction product at an elevated temperature, etc. A higher temperature may be utilized in order to remove the water as it is formed. The time of reaction is sufficient to effect the desired reaction and, in general, will range from about two to about forty hours or more. One or two mole proportions of the N,N-dicycloalkyl-alkanolamine are reacted per one mole proportion of the acid, anhydride or ester.

As hereinbefore set forth the reaction product of dicarboxylic acid and N,N-dicycloalkyl-alkanolamine will comprise an ester. When equal mole proportions of N,N-dicycloalkyl-alkanolamine and acid or derivative are reacted, the resulting compound will be a mono- or half ester. When two mole proportions of the N,N-dicycloalkyl-alkanolamine are reacted per one mole proportion of the acid or derivative, the resulting compound will be a di- or double ester. When a lower ester of the dicarboxylic acid is reacted with the N,N-dicycloalkyl-alkanolamine, the product also will comprise a new ester formed by transesterification.

The reaction product of the present invention generally is recovered as a viscous liquid or resinous product. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, etc., decalin, tetralin, alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The phenol may be used in a concentration of from about 1% and preferably from about 5% to about 500% by weight, and, more particularly, from about 10% to about 200% by weight of the reaction product.

The reaction product of the present invention will have varied utility and is useful as an additive to organic substrates which undergo oxidative, thermal or other deterioration. The additive functions as a lubricity or extreme pressure agent and also as flame-proofing agent. In addition, the additive serves as a detergent-dispersant, peroxide decomposer, corrosion inhibitor, rust inhibitor, etc. Organic substrates include gasoline, naphtha, kerosene, jet fuel, lubricating oil, diesel fuel, fuel oil, residual oil, drying oil, grease, wax, resin, plastic, rubber, etc.

The reaction product of the present invention may be used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160). The petroleum oils are obtained from paraffinic naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to twelve carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from four to twelve centistokes or higher, and (4) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

The reaction products of the present invention also possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The reaction products or mixture of these may be used for the control of various larvae, mites, eggs of mites and such insects as flour beetle, Mexican bean beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

As hereinbefore set forth, the reaction products of the present invention also possess flame-proofing or flame retardant properties and, therefore, are useful in plastics, coatings, paints, drying oils, etc., as well as in fibrous materials. For example, in textiles, the reaction product imparts flame retardant as well as fungicidal properties to the fabric.

The concentration of the reaction product to be employed as an additive will depend upon the particular substrate in which it is to be used. In general, the additive is used in a concentration of from about 0.001% to about 25% by weight of the substrate and more specifically within the range of from about 0.01% to about 5% by weight of the substrate. When used in conventional lubricating oil, the additive generally is employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiarybutylcatechol, 2,6-ditertiarybutyl-4-methylphenol, 2,4,-dimethyl-6-tertiarybutylphenol, 3,3',5,5'-tetratertiarybutyldihydroxydiphenylmethane, etc.

When desired an emulsifying agent may be employed in formulations containing the additive of the present invention. Any suitable emulsifying agent can be used, including alkali metal sulfonates of petroleum sulfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25% to 50% or even up to 98% by weight of the composition.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

EXAMPLE I

The reaction product of this example was prepared by reacting "A" anhydride (5,6,7,8,9,9-hexachloro-1,2,3,4,4a,5,8,8a-octahydro-5,8-methano - 2,3 - naphthalenedicarboxylic anhydride) with N,N-dicyclohexyl-ethanolamine. This reaction product was prepared by gradually adding over a period of 15 minutes, with stirring at room temperature, 425 g. (one mole) of "A" anhydride to a solution of 450 g. (two moles) of N,N-dicyclohexyl-ethanolamine dissolved in one liter of toluene. The reaction was mildly exothermic, the temperature rising to about 100° F. The reaction mixture was then heated to about 240° F. for one hour, during which time some water and toluene were liberated. About one liter of xylene then was added in increment portions and the mixture was heated and refluxed at 293° F. for several days, during which time 16 cc. of water was collected. The reaction mixture then was cooled and filtrate, which comprised about 59% by weight solution of active material in xylene, was recovered in an amount of 1362 grams, which corresponds to a yield of 94% of theoretical. A small portion of the solution was stripped of solvent and recovered as a dark, brittle glass. Analysis showed a basic equivalent weight of 433 g. which corresponds to the theoretical equivalent weight of 428.5 g.

EXAMPLE II

The reaction product of this example is prepared by reacting 1,4,5,6,7,7-hexachlorodicyclo-(2.2.1) - 5-heptene-2,3-dicarboxylic acid, herein referred to as "Chlorendic" acid, and N,N-dicyclohexyl-propanolamine. The reaction product is prepared by refluxing one mole proportion of "Chlorendic" acid with one mole proportion of N,N-dicyclohexyl-propanolamine in the presence of xylene solvent. The refluxing is continued until the theoretical amount of water is collected, after which the xylene solvent is removed by distilling under vacuum.

EXAMPLE III

The reaction product of this example is prepared by reacting 5,6,7,8,9,9 - hexachloro - 1,2,3,4,4a,5,8,8a-octahydro-1,4,5,8-dimethano - 2,3 - naphthalenedicarboxylic acid, herein referred to as "B" acid, with N,N-dicyclopentyl-ethanolamine. The reaction product is prepared by refluxing one mole proportion of "B" acid and one mole proportion of N,N-dicyclopentyl-ethanolamine in xylene solvent. The refluxing is continued until the theoretical amount of water is collected. In this preparation the xylene solvent is not removed but is retained as a solvent for ease in handling and use.

EXAMPLE IV

The reaction product of this example is prepared by reacting an ethyl ester of "B" acid (5,6,7,8,9,9-hexachloro-1,2,3,4,4a,5,8,8a - octahydro-1,4,5,8-dimethano-2,3-naphthalenedicarboxylic acid) with N,N-dicyclohexyl-ethanolamine. The ester of "B" acid is prepared by refluxing equal mole proportions of the acid and ethyl alcohol under conditions to liberate water, the water being removed simultaneously during the reaction. The resulting ester and N,N-dicyclohexyl-ethanolamine are refluxed in the presence of toluene solvent to liberate water and to form the reaction product.

EXAMPLE V

As hereinbefore set forth, one utility for the reaction products of the present invention is as an additive in lubricating oil. One method of evaluating lubricating oils is by the Falex machine. This procedure is described in detail in a book entitled "Lubricant Testing" authored by E. G. Ellis and published by Scientific Publications (Great Britain) Limited, 1953, pp. 150–154. Briefly, the Falex machine consists of a rotating pin which runs between two V-shape bearings which are spring loaded against the pin and provided with means for varying the load. The oil to be tested is poured into a metal trough in which the pin and bearings are partly submerged. The machine was operated for five minutes each at 250 and 500 pound loads and then forty-five minutes at 750 pound load. The data collected includes the temperature of the oil and the torque at each of the loads, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is a commercial SAE #90 differential oil free of additives. The results of evaluations of a sample of the oil without additive and a sample of the oil containing 6.4% by weight of the reaction product prepared as described in Example I are shown in the following table.

Run No. 1 is a run using the SAE #90 oil free of additives and therefore is the blank or control run.

Run No. 2 is a run which was made using another sample of the SAE #90 oil to which has been added 6.4% by weight of the reaction product prepared as described in Example I.

TABLE I

| Run No. | Temperature, °F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 1 | 177 | 280-S | ---- | 6-7 | S | ---- | 0 | S | ---- | 500 | 0.1 | 280 |
| 2 | 151 | 243 | 490 | 3-5 | 10-16 | 24-34 | 0 | 0 | 17 | 1,500 | 1 | 710 |

S—Seizure.

From the data in the above table it will be seen that the additive of the present invention imparted extreme pressure properties to the oil. The load was increased from 500 pounds to 1500 pounds.

EXAMPLE VI

The additive prepared as described in Example II is used as a high temperature detergent and dispersant in fuel oil. The additive is used in a concentration of 0.01% by weight of the fuel oil and serves to prevent filter plugging.

EXAMPLE VII

The reaction product prepared as described in Example III is used in a concentration of 1% by weight as an additive in grease. The additive is incorporated in a commercial Mid-Continent lubricating oil having an SAE viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D-942 method, in which method a sample of the grease is placed in a bomb and maintained at a temperature of 212° F. Oxygen is charged to the bomb, and the time required for a drop of five pounds pressure is taken as the Induction Period. A sample of the grease without additive will reach the Induction Period in about eight hours. On the other hand, a sample of the grease containing 1% by weight of the additive of the present invention will be of substantially higher stability.

EXAMPLE VIII

An insecticidal composition is prepared by dissolving 1 g. of the reaction product of Example IV in 2 cc. of benzene and emulsifying the resultant solution with 100 cc. of water using Triton X-100 as the emulsifying agent. The resulting emulsion is sprayed into a cage containing houseflies and results in substantial knockdown.

I claim as my invention:

1. The reaction product of a compound selected from the group consisting of polyhalopolyhydropolycyclicdicarboxylic acid, anhydride and ester of said acid with an N,N-dicycloalkyl-alkanolamine in which each cycloalkyl group contains from 5 to about 10 carbon atoms in the ring and the alkanolamine moiety contains from 2 to about 8 carbon atoms, said acid having the formula:

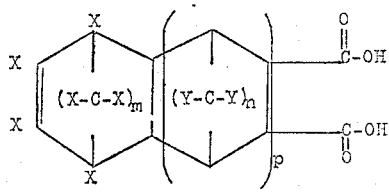

in which X is halogen, hydrogen or alkyl of from 1 to 10 carbon atoms, at least two X's being halogen, Y is halogen, hydrogen or alkyl of from 1 to 10 carbon atoms, $m$ is an integer of from 1 to 4, $n$ ranges from 0 to 4, and $p$ ranges from 0 to 4.

2. The reaction product of claim 1 wherein said polyhalopolyhydropolycyclicdicarboxylic acid is 5,6,7,8,9,9-hexachloro - 1,2,3,4,4a,5,8,8a - octahydro - 5,8-methano-2,3-naphthalenedicarboxylic acid.

3. The reaction product of claim 1 wherein said polyhalopolyhydropolycyclicidicarboxylic anhydride is 5,6,7,8,9,9-hexachloro - 1,2,3,4,4a,5,8,8a-octahydro-5,8-methano-2,3-naphthalenedicarboxylic anhydride.

4. The reaction product of claim 1 wherein said polyhalopolyhydropolycyclicdicarboxylic acid is 5,6,7,8,9,9-hexachloro - 1,2,3,4,4a, 5,8,8a - octahydro - 1,4,5,8 - dimethano-2,3-naphthalenedicarboxylic acid.

5. The reaction product of claim 1 wherein said polyhalopolyhydropolycyclicarboxylic anhydride is 5,6,7,8,9,9-hexachloro-1,2,3,4,4a, 5,8,8a-octahydro - 1,4,5,8-dimethano-2,3-naphthalenedicarboxylic anhydride.

6. The reaction product of claim 1 wherein said polyhalopolyhydropolycyclicdicarboxylic acid is 1,4,5,6,7,7-hexacholorodicyclo-(2.2.1) - 5 - heptene-2,3-dicarboxylic acid.

7. The reaction product of claim 1 wherein said N,N-dicycloalkyl - alkanolamine is N,N - dicyclohexyl-alkanolamine.

8. The reaction product of claim 1 wherein said N,N-dicycloalkyl-alkanolamine is N,N - dicyclohexyl-ethanolamine.

References Cited

UNITED STATES PATENTS 3,198,811   8/1965   Weil _____ 260—346.3
3,294,816   12/1966   Latos et al. _____ 260—326

LORRAINE A. WEINBERGER, *Primary Examiner.*

PAUL J. KILLOS, *Assistant Examiner.*

U.S. Cl. X.R.

252—51.5; 424—168, 299